Dec. 11, 1956 R. W. HUNTING 2,773,829
PROCESS AND APPARATUS FOR SUBSURFACE WASHING
Filed Jan. 11, 1954

INVENTOR
Ronald W. Hunting.

United States Patent Office 2,773,829
Patented Dec. 11, 1956

2,773,829

PROCESS AND APPARATUS FOR SUBSURFACE WASHING

Ronald W. Hunting, Prospect Park, Pa.

Application January 11, 1954, Serial No. 403,168

5 Claims. (Cl. 210—24)

The present invention relates to filters and particularly to ion exchangers and processes of filtering and ion exchange in which the top of the bed is locally whirled by backwash liquid while retaining the bottom undisturbed, and particularly the whirling action is accompanied by a counter-whirling effect that tends to break up agglomeration.

A purpose of the invention is to eliminate the loss of efficiency which occurs in ion exchangers after they have operated for a short period of time due to the tendency to form a cake or agglomerate at the surface.

A further purpose is to counteract the tendency of ion exchangers and the like to form agglomerates which travel downwardly in the bed, resist regeneration, and discharge unwanted ions in the service water.

A further purpose is to break up such agglomerates by whirling action of liquid introduced beneath the surface of the bed.

A further purpose is to propel particles in one main direction of whirling on a vertical axis at the top of the ion exchange bed and to break up the particles by counter-streams applied in an opposite direction to the direction of whirling.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

Figure 1 is a central vertical diagrammatic section of an ion exchanger according to the invention.

Figure 2 is a section on the line 2—2 of Figure 1.

Figure 3 is a view similar to Figure 2 showing a variation.

In the filtration of water and other liquids, difficulty has been encountered through the tendency of the filter medium to clog with material carried by the liquid being filtered. To overcome this difficulty, the filter medium is in many cases backwashed throughout the entire height of the filter bed at the end of the service phase of the cycle. This precaution is in many instances only partially effective.

The difficulty referred to above is particularly serious in ion exchangers, especially cation exchangers where the expense of the material forming the bed would make replacement very costly. For example, it has been found at the Schuylkill Station of the Philadelphia Electric Company, Philadelphia, Pennsylvania, that cation exchange units gradually reduced in capacity until after a few months' operation the capacity was only about 60% of the initial capacity. Along with the reduction in capacity, such cation exchangers show a tendency to pass cations into the service water long before the ion exchange bed should require regeneration.

These difficulties have been investigated and an effort has been made to correct them. The rate of impairment of the cation exchange beds is by no means uniform, since the beds deteriorate more rapidly in mid-winter and in the latter part of summer. It has been noted that the impairment of the beds is associated with the accumulation of a gelatinous deposit of silica, alumina and iron along with algae. The crust or deposit just referred to accumulates in about the upper six inches of the cation exchange bed (commercial beds used were approximately six feet thick). This deposit tends to cement together or agglomerate particles of the filter or ion exchange medium.

The agglomerates are harmful to bed operation in a number of respects. They tend to work their ways down in the bed, growing continually larger, and becoming relatively heavier and tending to stay near the bottom. When this happens backwashing fails to move the agglomerates to the top. The agglomerates, therefore, less readily come in contact with strong regenerating solution and tend to resist regeneration. Insofar as the agglomerates do travel vertically during the service phase or the backwash phase, they tend to clear a path through which channeling takes place. Channeling is objectionable as it permits water to pass through the bed in the service phase of the cycle without the removal of hardness and it also permits regeneration to take place without contacting all of the ion exchange particles.

Thus it will be seen that on further service phases, incompletely regenerated ion exchange particles will discharge calcium and magnesium to the service water.

Efforts have been made without success to break up the agglomerates and the crust by air-lancing. Efforts have also been made to introduce water vertically at points immediately beneath the surface of the ion exchange bed, and this has met with considerable success, although there is a tendency to expend an appreciable part of the force of the water in raising the ion exchange particles so that particles may be swept out of the top of the ion exchanger if excessive pressure is used.

By the introduction of localized backwashing liquid near the top of the bed in a horizontal whirling direction and preferably also counter-whirling the particles, I have found that it is possible to restore the capacity of an ion exchange bed from 60% to 100% in a short period of operation. The whirling can be done during backwashing, but it is preferably accomplished before the general backwashing used in the backwash phase of the cycle, and during the service phase of the cycle by temporarily interrupting the service phase.

The position at which the water is introduced for localized whirling backwashing is preferably just below the top of the bed, desirably about a foot below the top, although it is advantageous to introduce localized whirling backwashing at any position above the bottom. The force of the water is not primarily exerted in a direction tending to project particles from the bed, nor does is churn up the entire bed, but rather is applied to break up the agglomerates.

The effectiveness of the whirling backwashing applied in accordance with the invention is believed to be due to several factors. The impact of the stream of water and especially the whirling and counter-whirling disintegrate agglomerates and prevent them from becoming large. Furthermore, since the water introduced by localized backwashing is withdrawn at the top, the tendency is to progress any remaining agglomerates toward the top of the bed to a position at which they will come in contact with strong regenerating solution. Furthermore, agglomerates do not cause channeling either during the service phase or the regeneration phase. Also, the jets of water have the effect of breaking up the crust and removing foreign matter present in the crust at the top of the bed.

In some procedures the localized whirling backwash is sufficient if applied at the end of the service phase of the cycle before the general backwash through the entire height of the bed, or as part of the general backwash.

One of the main advantages of the present invention is that the swirling action positively tends to break up or disrupt agglomerates. This effect is produced mainly by the principal stream which extends in one direction of whirling, but to a secondary and lesser extent it is promoted by the counter-streams, which while carrying a smaller volume of water from the same water source tend to strike against agglomerates in the main whirl and break them up.

Due to the fact that I introduce the localized whirling backwash water horizontally, it is possible to use much higher jet forces than would otherwise be suitable, since the bulk of the force expends itself in rotation and only a minor component tends to force the particles at the top of the ion exchanger.

I find for example that pressures of 20 to 30 p. s. i. g., with a multiplicity of nozzles each of the order of 5/16 inch diameter can be used very effectively, the number of nozzles directed in the main direction of whirl preferably being at least fifty percent greater than the number of opposed nozzles (and the effective area being correspondingly adjusted if the nozzles are of different sizes).

It will be evident, of course, that it is very much more desirable to whirl the upper portion of the bed while the lower portion is unagitated, since general agitation of the bed is undesirable as increasing the over-all fluidity and tending to give agglomerates a chance to move down.

Not only does the whirling action break up agglomerates, but it also tends to cut off accummulated deposits and coatings from the resin particles, and thus greatly increases the effectiveness of the cleaning action in removing dirt, precipitates, entrained material and algae.

Considering now the drawings, more in detail, Figures 1 and 2 show an ion exchanger 20, suitably a metallic tank, containing a supporting base of porous material such as coal at the bottom at 21, and supporting thereon a bed of ion exchange material 22, suitably cation exchange material, which may be a zeolite water softener, but will preferably be a cation exchange synthetic resin of the character of any of the resins described in Kunin and Myers, Ion Exchange Resins (1950).

The bed 22 will preferably be of the order of approximately six feet thick when using a resin of the character of phenolic and acrylate base resins.

Above the bed 22 is a space 23 which normally contains inlet water. Water is introduced into the ion exchanger at the top through a water distributing lateral 24' connected to a pipe 2 coming in from the outside. During the service phase of the cycle, water is withdrawn from an outlet lateral 26 placed in the supporting base 21 and connecting with a discharge pipe 27.

A regenerating solution distributing lateral 28 is provided above the ion exchange bed 22 and preferably beneath the water inlet lateral, and this connects to a regenerating solution pipe 30.

In accordance with the invention a localized backwash lateral 31 is placed in the bed of ion exchange resin, and suitably just below the top crust 32, which normally extends down about six inches in a commercial ion exchange bed. It has been found desirable to position the lateral 31 about a foot below the top of the ion exchange bed. The lateral 31 connects to an inlet pipe 33.

The localized backwash lateral 31 desirably is composed of a series of radial arms 34 each having on one side, which is directed in the same rotary direction around the axis, a series of main localized backwash jet openings 35, which tend to create a whirling motion on a vertical axis, thus introducing the water horizontally and in a whirl.

In the preferred embodiment as shown in Figures 1 and 2, each of the arms 34 has in the counter-rotary direction counter localized backwash jets 36 which are designed to produce a smaller total effective discharge area. Thus, if the jets 35 and 36 are of the same cross section and connect to the same source of liquid (water) on the inside of the arms 34, fewer jets 36 than the number of jets 35 on each arm assure that the counter-whirling effective jet area is less than the whirling jet area.

This, therefore, assures that the agglomerates are directed in a main whirling course following arrow 37 of Figure 2, but that at intervals they encounter counter-whirling jets in the direction of arrow 38, and the impingement of the counter jets tends to further the action of the main jets in breaking up the agglomerates.

It will, of course, be understood as shown in Figure 3 that part of the advantage of the invention can be obtained on lateral 31' by using the main whirling action from the main jets 35 without using counter jets 36. It is, however, preferable to use both sets of jets.

During the normal service phase of the cycle, the cation exchange bed 22 collects cations such as calcium, magnesium and sodium from water flowing downwardly from the inlet lateral 24 through the ion exchange bed and out the discharge lateral 26. As the ion exchange capacity of the resin bed is reached, cations will begin to pass into the service water, and as this condition is encountered the end of the service phase of the cycle is reached in normal operation.

According to normal prior art practice, which is also followed in the present invention, at the end of the service phase of the cycle the resin bed 22 is backwashed by passing the raw water upwardly from the lateral 26 through the full height of the resin bed and out the lateral 24. Suspended solid material which may have accumulated is thus washed out of the resin bed and the resin bed is redistributed and fluffed up.

In the next stage of the cycle, according to the prior art and also according to the present invention, regeneration solution, usually dilute sulfuric acid, is passed in through the lateral 28, down through the resin bed and out through the lateral 26. Finally the resin bed is washed by raw water passed in through the lateral 24 at the top and out through the lateral 26 at the bottom.

Under normal prior art practice, the service phase of the cycle is uninterrupted, continuing from the end of the rinse to the beginning of the next backwashing. In accordance with the preferred form of the present invention, however, the service phase of the cycle includes a localized backwash applied by introducing water generally horizontally in a whirl through the localized backwash lateral 31 to flow upwardly through the crust 32 and out the lateral 24.

This localized backwashing is preferably applied at the end of the service phase of the cycle immediately before the backwash phase of the cycle, although it can be applied during the general backwash (through the full depth of the bed).

While the invention is believed to have its widest application to ion exchangers, it is also considered to be applicable to other filter beds, including filters of the type in which spent ion exchange material is used as a filter medium, and also to filters using other media such as slow sand water filters, coal filters, and also filters for oil, and liquids.

In view of my invention and disclosure variations and modifications to meet individual whim or particular need will doubtless become evident to others skilled in the art, to obtain all or part of the benefits of my invention without copying the process and apparatus shown, and I therefore, claim all such insofar as they fall within the reasonable spirit and scope of my claims.

Having thus described my invention, what I claim as new and desire to secure by Letters Patent is:

1. The process of ion exchange using an ion exchange bed, which comprises passing water downwardly through the ion exchange bed during the service phase of the cycle, at the end of said service phase introducing water whirling in one direction on a generally vertical axis at a level beneath and adjacent to the surface of said bed, concurrently introducing a relatively smaller volume of water in distributed streams of high velocity at about the same level whirling on a vertical axis in the opposite direction, said introduced water being withdrawn upwardly through said bed without disturbing the bottom, afterward passing water upwardly through the entire bed during the backwash phase, and then regenerating and rinsing the bed.

2. An ion exchanger comprising a vertical bed, inlet and outlet connections respectively above and below the bed, and a lateral in the bed beneath the top and adjacent thereto having jet openings directed generally horizontally and preponderantly in a direction to whirl the liquid introduced in the jet openings in one direction, and having opposed jet openings from the lateral of relatively smaller total effective discharge area.

3. The process of ion exchange using an ion exchange bed, which comprises passing water downwardly through the ion exchange bed during the service phase of the cycle, at the end of the service phase introducing water on a level beneath and adjacent to the surface of said bed whirling in a main direction on a generally vertical axis and causing the ion exchange material including any agglomerates thereof to rotate with the water current, concurrently introducing a relatively smaller volume of water forcefully from a plurality of distributed stationary jets directed tangentially in the opposite direction, whereby said agglomerates are carried by the current in the main direction into the high velocity streams from said stationary jets and are thereby broken up, at the same time withdrawing said introduced water upwardly through said bed without disturbing the bottom, passing water upwardly through the entire bed during the backwash phase and then regenerating and rinsing the bed.

4. A water treatment apparatus comprising a vertical bed, inlet and outlet connections respectively above and below the bed, and a lateral in the bed beneath the top and adjacent thereto having jet openings directed generally horizontally and preponderantly in a direction to whirl the liquid introduced in the jet openings in one direction, and having opposed jet openings from the lateral of relatively smaller total effective discharge area.

5. The process of washing a liquid treatment bed of particles of liquid treating medium following a service phase of the cycle in which liquid to be treated is passed downwardly through the bed, which comprises introducing liquid whirling in one direction on a generally vertical axis at a level beneath and adjacent to the surface of said bed, concurrently introducing a relatively smaller volume of liquid forcefully from a plurality of distributed stationary jets directed generally tangentially in the opposite direction, said introduced liquid being withdrawn upwardly through said bed without disturbing the bottom, thereby locally backwashing the upper portion of the bed.

References Cited in the file of this patent

UNITED STATES PATENTS

| | | |
|---|---|---|
| 648,105 | Greer | Apr. 24, 1900 |
| 654,479 | McNally | July 24, 1900 |
| 678,532 | Bachman | July 16, 1901 |
| 1,794,841 | Elfreth | Mar. 3, 1931 |
| 1,926,681 | Lauterbur et al. | Sept. 12, 1933 |
| 1,942,807 | Dotterweich | Jan. 9, 1934 |
| 2,258,063 | Meyer | Oct. 7, 1941 |
| 2,351,835 | Pick | June 20, 1944 |
| 2,461,619 | Wolcott | Feb. 15, 1949 |
| 2,472,976 | Hoover | June 14, 1949 |